United States Patent [19]

Mina

[11] Patent Number: 5,678,866
[45] Date of Patent: Oct. 21, 1997

[54] CORROSION RESISTANT HUB WITH ELASTOMERIC SEAL

[75] Inventor: Nabil L. Mina, Roselle, Ill.

[73] Assignee: Appleton Electric Company, Chicago, Ill.

[21] Appl. No.: 569,714

[22] Filed: Dec. 8, 1995

[51] Int. Cl.$^6$ .................................................. F16L 5/02
[52] U.S. Cl. .................... 285/161; 439/556; 174/65 R; 174/153 R; 285/55; 285/206; 285/189; 285/47
[58] Field of Search .................... 285/47, 55, 161, 285/220, 211, 212, 207, 205, 206, 189; 174/65 R, 65 G, 655 SS, 151, 153 R; 439/548, 556, 559

[56] References Cited

U.S. PATENT DOCUMENTS

| | | | |
|---|---|---|---|
| 2,704,833 | 3/1955 | Heller | 439/556 |
| 2,712,120 | 6/1955 | Cochran | 439/556 |
| 2,731,612 | 1/1956 | Heller | 439/556 |
| 2,731,613 | 1/1956 | Heller | 439/556 |
| 3,104,120 | 9/1963 | Myers | 285/161 |
| 3,609,214 | 9/1971 | Totsuka | 174/65 R |
| 3,624,812 | 11/1971 | Rosan | 285/161 |
| 3,770,878 | 11/1973 | Dozier | 174/153 R |
| 4,022,262 | 5/1977 | Gunn | 285/212 |
| 4,373,112 | 2/1983 | Mizuno | 174/65 R |
| 5,280,966 | 1/1994 | Morris et al. | |
| 5,295,851 | 3/1994 | Bawa et al. | |

*Primary Examiner*—Eric K. Nicholson
*Attorney, Agent, or Firm*—Jones, Day, Reavis & Pogue

[57] ABSTRACT

A corrosion resistant hub with a metal insert and an elastomeric outer shell forms a coupling to join a conduit to an enclosure. The metal insert which serves as a grounding mechanism for the conduit comprises internal threads, located near the conduit receiving end of the insert, to connect the conduit to the hub, and external threads, located at the wire exiting end of the insert to connect the hub to the enclosure. A shell made of semi-rigid elastomeric material is molded onto the outer surface of the metal insert. The shell has an annular flange, a hexagonally shaped torquing section and a collar. The annular radial flange forms a reliable seal of the interface between the insert and the enclosure. The collar has a lip that forms a first seal of the junction between the conduit and the insert and internal threads that engage the conduit to provide a second seal of the junction between the conduit and the insert. The hub also has a bushing which is unitary with the shell via an aperture in the insert. The bushing is molded into the inner surface of the metal insert at the wire exiting end of the insert.

22 Claims, 4 Drawing Sheets

CORROSION RESISTANT HUB WITH ELASTOMERIC SEAL

BACKGROUND OF THE INVENTION

1. Field of Invention

This invention relates to a hub for joining an electrical conduit to an enclosure. The hub has an elastomeric shell around a metal insert containing an elastomeric bushing.

2. Description of Related Art

A hub is a coupling that connects a conduit carrying at least one and usually a plurality of electrical wires to an enclosure which contains an electrical device such as a junction box. Hubs generally are made of metal for structural rigidity and to provide ground continuity between the conduit and the wiring leading into the enclosure. Hubs are typically cylindrical with a bore which extends from a receiving end to an exiting end. The receiving end is equipped with internal threads for receiving external threads of the conduit and the exiting end is equipped with external threads for engaging internal threads of a nut plate within the enclosure. Some hubs have an annular, machined recess adjacent the exiting end to accommodate a gasket, such as an O-ring, which seals the interface between the hub and the enclosure.

To install the hub to the enclosure, the gasket is mounted around the hub near the exiting end. The hub is then inserted into an opening in a wall of the enclosure with the gasket between the wall and the rest of the hub. The nut plate, which is located within the enclosure, is screwed around the exiting end of the hub, so the wall of the enclosure is sandwiched between the nut plate and the gasket. The hub is then torqued into the nut plate until the gasket is compressed against an outer surface of the wall to obtain the desired seal. A sealing compound or grease is also applied between the hub and the enclosure to obtain a strong seal.

Some enclosures have internal threads in the opening in the wall of the enclosure for receiving external threads of the exiting end of the hub. The exiting end of the hub is screwed directly into the opening in this type of enclosure without using a nut plate.

O-rings are commonly used as gaskets for hubs. Although O-rings often perform well as gaskets, an annular recess must be accurately machined in the hub thereby requiring extra manufacturing time. Some hubs include a metal annular flange with an annular recess machined therein to properly accommodate the O-ring. If the hub is not exactly installed perpendicular to the wall of the enclosure or if the annular recess does not contain a consistent depth, the hub can squeeze the O-ring against the enclosure too much on one side and too little on the other side. Over time, the unevenly squeezed O-ring can deform and lose its effectiveness as a seal. Hence, the inability of an O-ring to compensate for misalignment and offer a proper seal can be a genuine concern.

U.S. Pat. No. 5,295,851 in the name of Bawa et al. attempts to improve the effectiveness of the O-ring as a gasket for sealing hubs by providing an annular shoulder having a groove therein for seating an irregularly shaped O-ring. However, to obtain the structure disclosed by Bawa et al., the annular shoulder must be fashioned and a groove machined therein to properly accommodate the irregularly shaped O-ring, thereby requiring additional material and manufacturing time. Moreover, the device disclosed by Bawa et al. still does not ensure even alignment between the O-ring on the hub and the enclosure.

U.S. Pat. No. 5,280,966 in the name of Morris et al. discloses a hub with a flange made of the same metal material as the connector body. However, other hardware is required to obtain the required seal of the hub disclosed by Morris et al.

Other publicly available hubs have flexible polyvinylchloride coatings to insulate the metal hub from the outside environment. The polyvinylchloride coating extends out from the receiving end of the hub and flares out from the metal annular flange to provide a skirt for engaging the wall at the interface between the hub and the wall of the enclosure. However, because the polyvinylchloride coating is so flexible, it is easily deformable and unreliable as a seal of the interface between the hub and the wall of the enclosure. Hence, with these hubs the only reliable seal of the interface between the wall of the enclosure and the hub is an O-ring. Therefore, these hubs present the previously described disadvantages which attend the use of an O-ring.

SUMMARY OF THE INVENTION

The present invention overcomes the disadvantages of the previous hubs for coupling conduits to enclosures. Therefore, an object of the present invention is to provide a hub which has a metal insert with a semi-rigid elastomeric flange around the insert for providing a reliable seal between a wall of an enclosure and the insert.

Another object of the invention is to provide a hub which will provide a sole seal between the insert and the wall of the enclosure without having to employ gaskets and sealing compounds.

An additional object of the present invention is to provide an elastomeric shell which includes the flange and a cylindrical collar for sealing the interface between the insert and the conduit.

A further object of the invention is to provide a hub with an interior bushing which is unitary with the shell via an aperture in the metal insert.

An even further object of the invention is to provide a hub that is corrosion resistant and able to prevent moisture from entering the electrical enclosure.

A still further object of the invention is to provide a hub in which the shell and the bushing are molded directly onto the metal insert.

The foregoing present invention is a hub assembly that is made of metal and plastic for connecting a conduit to an electrical enclosure. The hub comprises a metal, cylindrical insert made preferably of stainless steel that has a bore therein extending between a receiving end and an exiting end. The exiting end has external threads that engage internal threads of a nut plate located within the enclosure. The receiving end has internal threads that engage external threads of the conduit. Both the external and internal threads are preferably machined on the metal, cylindrical insert. An elastomeric shell comprises an annular flange and may include a midsection shaped preferably as a hexagonal nut and a cylindrical rear collar. The shell is preferably molded directly onto the metal insert.

The shell prevents moisture from traveling into the hub where it can interfere with the electrical components. The annular flange is adjacent to the external threads of the exiting end of the insert. The flange bears against the outer surface of the wall of the enclosure when a nut plate with internal threads is screwed onto the external threads of the exiting end of the insert. The flange provides a reliable seal of the interface between the insert and the wall of the enclosure. The seal is so reliable that no other seal or sealing compound at the interface is needed. An annular lip located within the cylindrical collar remote from the receiving end of the insert and internal threads in the interior of the shell adjacent to the internal threads of the insert which receive the external threads of the conduit both seal the junction between the conduit and the insert.

The hub also has a bushing that is molded to the inner surface of the exiting end of the metal insert. The bushing is unitary with the shell via an aperture in the insert and provides added insulation to the electrical wiring.

Other objects, features and advantages of the present invention will become apparent from the following detailed description of the preferred embodiment of the invention when taken in conjunction with the drawings and the appended claims.

BRIEF DESCRIPTION OF THE DRAWINGS

The drawings which are part of the disclosure illustrate the present invention.

DETAILED DESCRIPTION OF THE INVENTION

Figure 1:
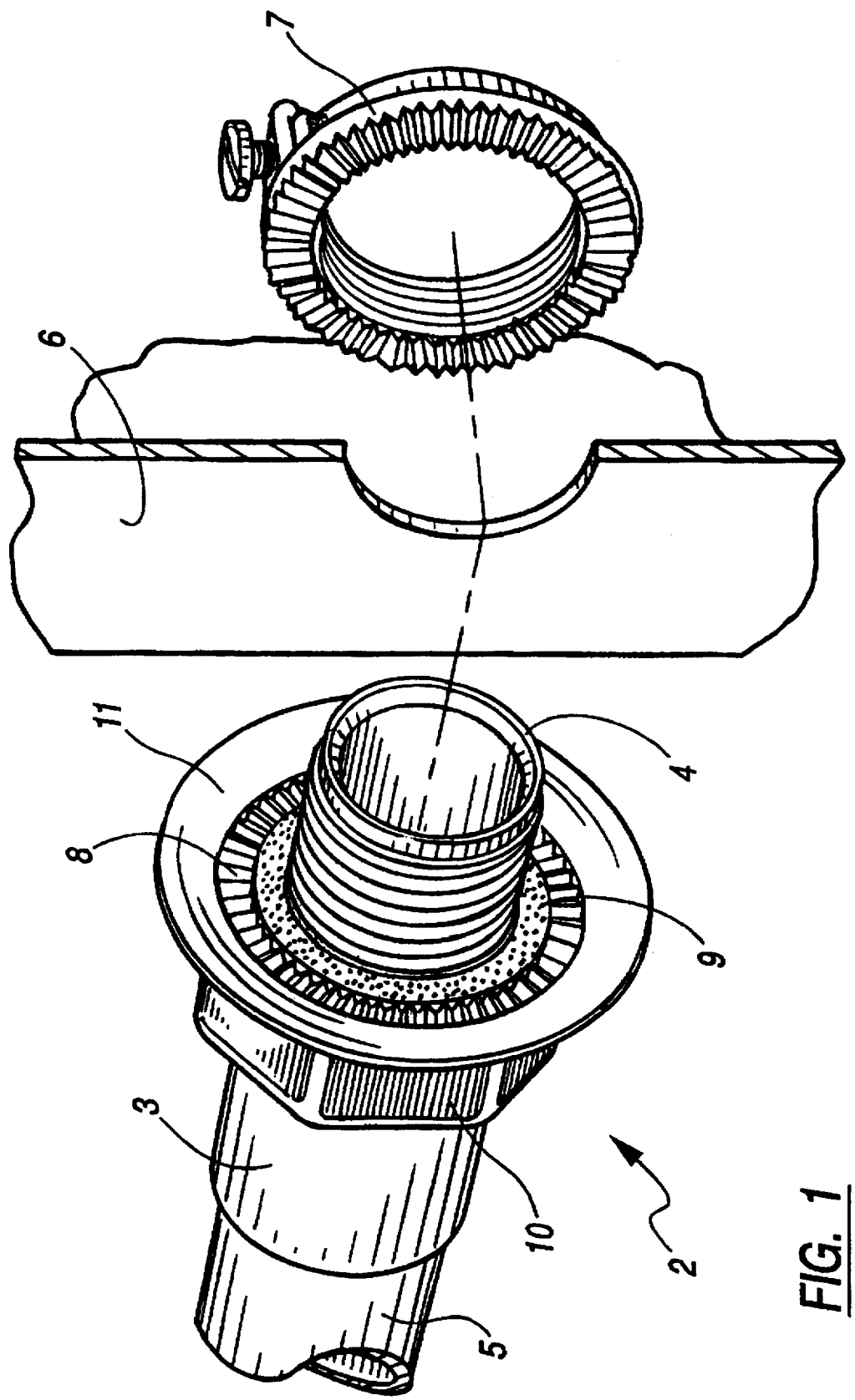
FIG. 1 is an exploded perspective view of a hub assembly of the prior art.

FIG. 1 illustrates a hub 2 of the prior art. The prior art hub 2 is a hollow, metal cylinder which has a conduit receiving end 3 and a wire exiting end 4. The conduit receiving end 3 is equipped with internal screw threads therein for receiving external screw threads of a conduit 5. The wire exiting end 4 is equipped with external screw threads for protruding through an opening in the wall of an enclosure 6 and engaging internal screw threads of a nut plate 7 in the interior of the enclosure 6. The hub 2 has a knurled, annular flange 8 made of metal with an annular groove machined therein for seating an O-ring 9. The hub 2 has a polyvinyl-chloride coating 10 to insulate the hub 2 from the outside environment. The polyvinylchloride coating 10 flares out from the annular flange 8 to provide a skirt 11. The skirt 11 engages the wall of the enclosure 6 at the interface between the hub 2 and the wall. Because the skirt 11 is so flexible, it is easily deformable and not reliable as a seal between the hub 2 and the wall of the enclosure 6. The O-ring 9 provides the reliable means of sealing the interface between the hub 2 and the wall of the enclosure 6. Therefore, if the hub 2 is angularly misaligned with respect to the wall of the enclosure 6, the O-ring 9 is subject to uneven squeezing, which can render it ineffective.

Figure 2:
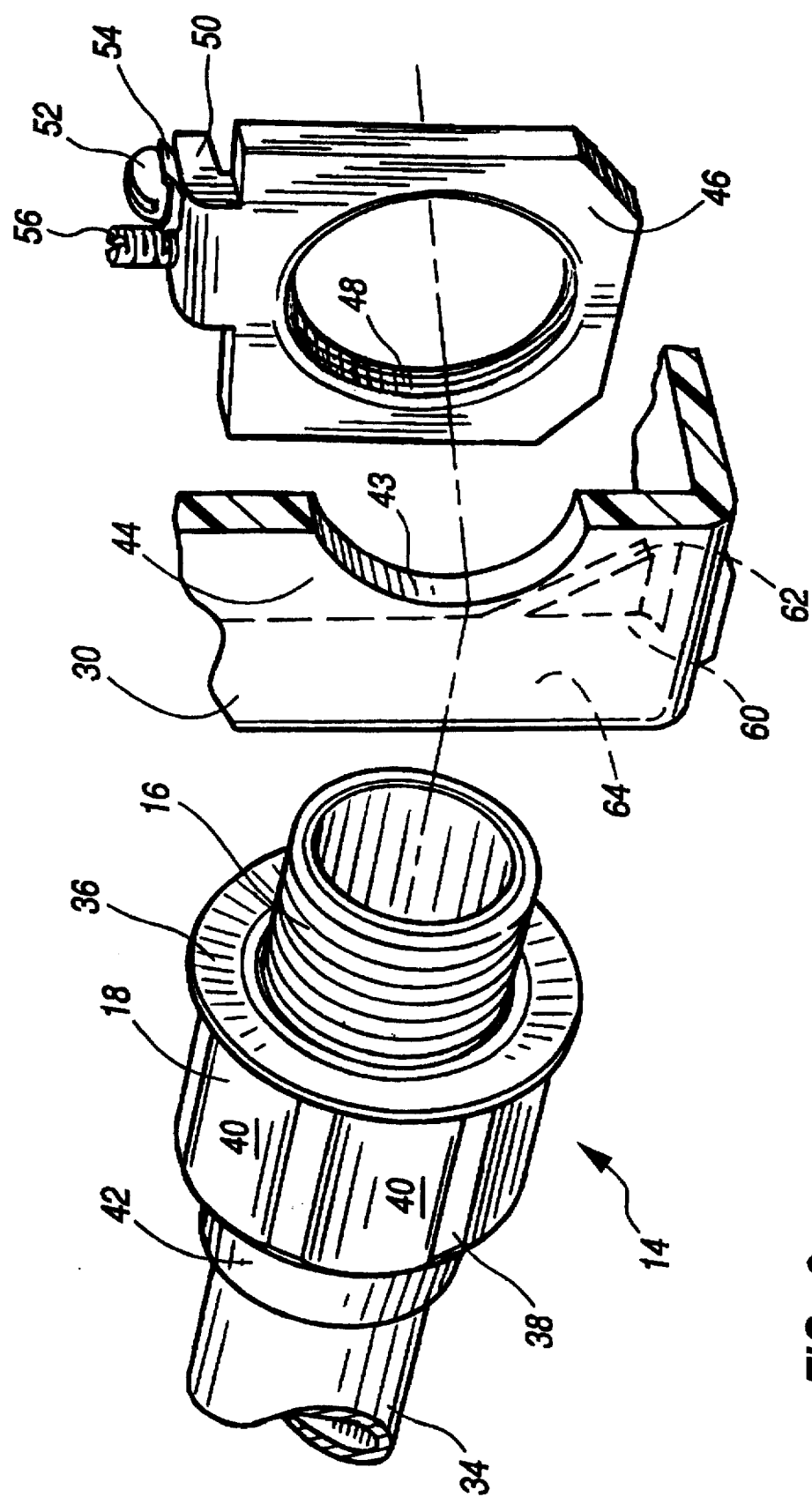
FIG. 2 is an exploded perspective view of the hub assembly of the present invention.
Figure 3:
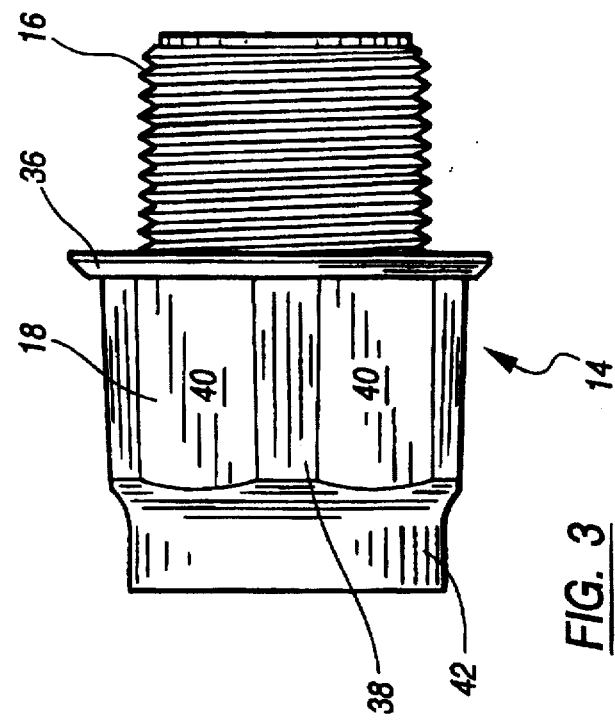
FIG. 3 is a side view of the present invention.

The hub 14 of the present invention comprises a cylindrical hollow insert 16 surrounded by an elastomeric shell 18 as shown in FIGS. 2 and 3. The elastomeric shell 18 is semi-rigidly attached to the metal insert 16.

Figure 4:
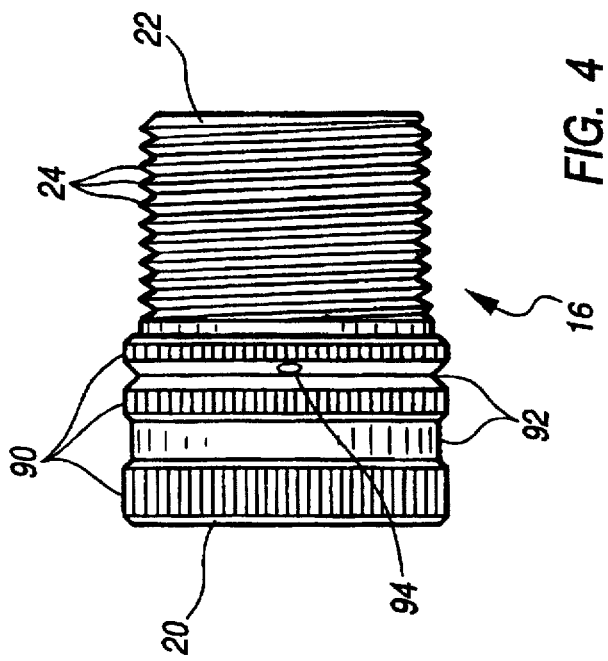
FIG. 4 is a side view of an insert of the present invention.

The insert 16 in the hub 14 with the shell 18 removed is depicted in FIG. 4. The insert 16 has a conduit receiving end 20 interiorly connected by a bore to a wire exiting end 22. The exiting end 22 has external screw threads 24 therearound for connection to an enclosure 30 as shown in FIG. 2. The hub 14 of the present invention can adapt to either a metallic or non-metallic enclosure. The exiting end 22 may have a sufficient number of external screw threads 24 to render the hub 14 explosion-proof. The receiving end 20 has internal screw threads 32 shown only in FIG. 5 therein for connection to a conduit 34 as shown in FIG. 2. The insert 16 is suitably made of a non-corrosive metal, such as aluminum and preferably stainless steel.

The shell 18 preferably is generally bell-shaped, although other shapes may be suitable, and made of a semi-rigid elastomer. Although many elastomers may be suitable for the present invention, the preferred elastomer is a polyether-ester block copolymer available from E. I. du Pont de Nemours & Co., one of which is sold under the trade name of HYTREL® 7246 with HYTREL® 40 CB protection against ultraviolet light. The shell 18 has an annular flange 36 extending from a periphery of the insert 16 near the exiting end 22 thereof, a torquing section 38 having preferably six working faces 40 arranged equilaterally around the receiving end 20 of the insert 16, and a collar 42 which extends beyond the receiving end 20 of the insert 16.

The hub 14 is connected to a front wall 44 of the enclosure through an opening 43 in the front wall 44 by means of a nut plate 46 as shown in FIG. 2. The nut plate 46 can take many forms but essentially comprises a nut with internal threads 48 around an aperture therein for receiving the corresponding external threads 24 at the exiting end 22 of the insert 16. The preferred nut plate 46 comprises a thick plate with an internally-threaded, circular aperture therein.

Some nut plates include a cylindrical collar extending from the plate which shares the circumference of the circular aperture and has internal threads in the collar for receiving the external threads 24 at the exiting end 22 of the insert 16. Other suitable nut plates comprise an internally threaded nut and a separate plate with an aperture therein which receives the exiting end 22 and is sandwiched between the nut and the interior of the wall 44 of the enclosure 30.

The preferred nut plate 46 has a flange 50 with a small, internally threaded aperture therein for receiving a small set screw 52. The screw 52 is used for attaching an equipment grounding wire to the nut plate 46. The screw 52 extends through a square saddle 54. Upon screwing the screw 52 through the saddle 54 and into the aperture in the flange 50, the force of the screw 52 engaging the saddle 54 causes the saddle 54 to deflect as shown in FIG. 2. The friction between the saddle 54 and the screw 50 prevents the screw 50 from unscrewing. A threaded pin 56 is screwed into a second aperture in the flange 50 adjacent the set screw 52. The pin 56 prevents the saddle 54 from rotating thereby preventing the set screw 52 from turning and the ground wire from coming loose.

In an alternative embodiment, the nut plate 46 can include a return (not shown) which engages a protuberance (not shown) on the interior side of the front wall 44 of the enclosure 30. Upon engagement, the protuberance prevents the return from rotating, thereby preventing the nut plate 46 from rotating in a particular direction.

Preferably, the enclosure 30 has a pocket 60 defined by a free standing wall 62, a sidewall 64 of the enclosure 30 and the front wall 44 of the enclosure 30. When a corner of the nut plate 46 is slid into the pocket 60, the nut plate 46 limits rotation in the direction of the adjacent sidewall 64 and limits movement away from the front wall 44. Preferably, pockets 60 are provided on both sides of the nut plate 46 to restrict rotation in either direction.

Figure 6:
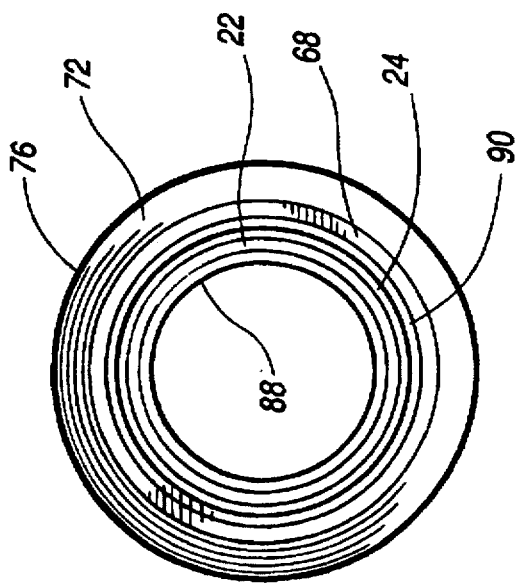
FIG. 6 is a front view of an exiting end of the present invention.
Figure 5:
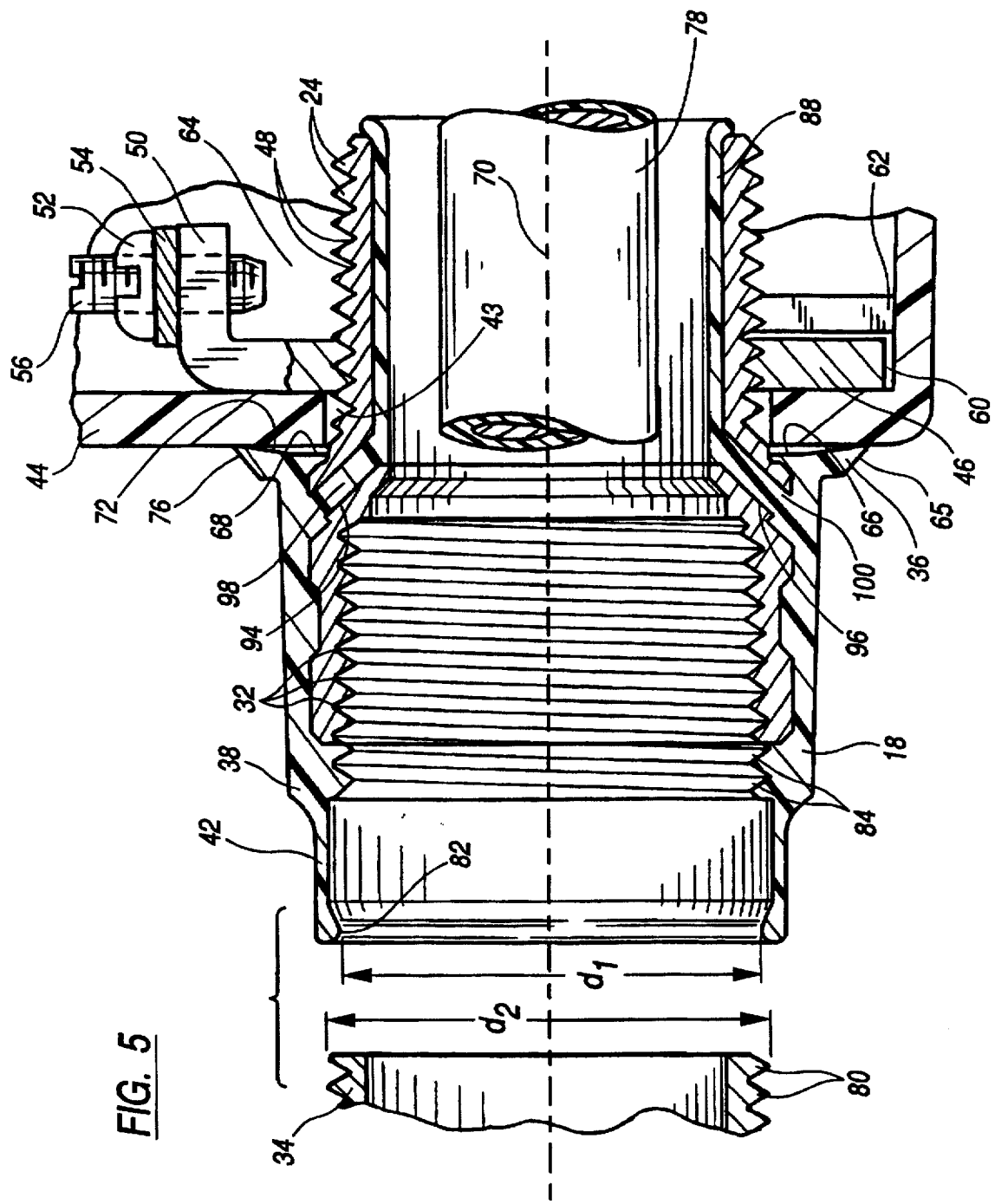
FIG. 5 is an enlarged cross-sectional view of the hub assembly of the present invention.

The annular flange 36 of the shell 18 has a narrow, frustoconically configured outer surface 65 and a slightly recessed inner surface 66. The inner surface 66 has two annular inner faces as shown in FIGS. 5 and 6. The innermost annular face 68 is substantially perpendicular to an imaginary longitudinal axis 70 through the hub 14. In other words, the innermost, inner annular face 68 is contained in a plane perpendicular to the longitudinal axis 70. The outermost annular face 72 is acutely angled with respect to the imaginary longitudinal axis 70 through the hub to provide an outer circular edge 76 around the outermost annular face 72. The circular edge 76 is the part of the flange 36 closest to the exiting end 22 of the insert 16. The circular edge 76 is contained in a plane parallel with the plane containing the face 68 but spaced closer to the exiting end of the insert than the plane containing the face 68. This construction provides for the outer circular edge 76 to be the first part of the flange 36 to make contact with the front wall 44 of the enclosure 30 during installation of the hub 14.

Because the flange 36 has a frustoconical outer surface 65 and because the outermost annular face 72 is acutely angled with respect to the longitudinal axis 70 through the hub 14, the thickness of the annular flange 36 diminishes down to a smallest thickness at the outer circular edge 76. It is noted that the frustoconical surface 65 in inclined with respect to the axis 70 to a degree greater than that of the outermost, inner annular face 72. Naturally, the resistance of the flange 36 to deformation decreases proportionally as the thickness of the flange decreases. Because the circular edge 76 is the thinnest portion of the flange, it is the least resistant to deformation. The resistance of the flange 36 to deformation increases as the thickness of the flange 36 increases. Accordingly, the resistance to deformation gradually decreases as the distance from a center of the hub 14 increases.

As shown in FIG. 5, upon insertion of the exiting end 22 of the insert 16 into the opening 43 in the front wall 44 of the enclosure 30, the circular outer edge 76 contacts the front wall 44 around the opening 43 and deforms to accommodate any irregularities in the front wall 44 of the enclosure 30 or any misalignment between the hub 14 and the front wall 44 of the enclosure 30. The thicker portions of the flange 36 resist deformation and urge the circular edge 76 into contact with the front wall 44 to seal an interface between the insert 16 and the front wall 44. The constant urging of the circular edge 76 against the wall 44 withstands tendencies toward loosening due to gradual deformation over time. Because the circular edge 76 maintains continuous contact with the front wall 44, the flange 36 provides a reliable seal of the interface between the insert 16 and the front wall 44. The flange 36 may serve as the sole seal of the interface between the insert 16 and the front wall 44. No O-ring or sealing compound is required to maintain the seal.

To install the hub 14 into the enclosure 30. The nut plate 46 is positioned inside the enclosure 30 with the corner of the nut plate 46 slid into the pockets 60. The exiting end 22 is inserted through the opening 43 in the front wall 44 of the enclosure 30, so the aperture in the nut plate 46 aligns with the exiting end 22 to allow the internal threads 48 in the nut plate 46 to engage the corresponding, external screw threads 24 of the exiting end 22. The hub 14 is screwed into the nut plate 46 and tightened, so the outer circular edge 76 contacts the front wall 44.

The corners of the nut plate 46 seated in the pockets 60 restrict rotation of the nut plate 46 with respect to the longitudinal axis 70 to facilitate tightening of the exiting end 22 of the hub 14 into the nut plate 46. A wrench or other torquing tool can be used to grip the torquing section 38 of the shell 18 and turn the hub 14 until the complete circular outer edge 76 of the annular flange 36 tightly bears against the outside of the front wall 44 of the enclosure 30 to provide a solely reliable seal for the interface between the insert 16 and the front wall 44 of the enclosure 30. Although the engagement of the exiting end 22 into the opening 43 in the wall 44 and into the nut plate 46 seals off the interior of the hub 14 and the interior of the enclosure 30, the annular flange 36 seals off the interface between the front wall 44 and the insert 16. Thus, the hub 14 is firmly anchored in the wall of the enclosure with a tight seal of the interface therebetween without the need for any additional sealing gasket or sealing compound.

The shell 18 is semi-rigidly attached to the insert 16. The semi-rigid attachment facilitates alignment of the flange 36 flushly with the front wall 44 during installation and diminishes the possibility of misalignment between the hub 14 and the front wall 44. Consequently, the prior art problems associated with uneven squeezing of the sealing means is diminished by the structure of the hub 14.

The insert 16 has internal screw threads 32 therein at the conduit receiving end 20. The internal screw threads 32 have a gradual taper to accommodate a correspondingly gradual taper of external screw threads 80 on the standard conduit 34. Either before or after the hub 14 is anchored to the front wall 44 of the enclosure 30, the conduit 34 is screwed into the conduit receiving end 20 of the insert 16. The completed assembly protects at least one electrical wire carried in the conduit 34, through the hub 14 and into the enclosure 30 where the wire is connected to an electrical device such as a circuit board, a switch, etc. housed in the enclosure 30. The hub can carry several wires or a cable 78 containing several wires as shown in FIG. 5. An additional electrical wire can serve as a grounding wire and can be attached to the set screw 52 through the aperture in the flange 50 on the nut plate 46, preferably in the manner previously described, to provide a continual ground path from the nut plate 46, through the insert 16 in the hub 14 to the conduit 34.

The cylindrical collar 42 extending from the shell 18 is equipped with two annular components which serve as two seals for a junction between the conduit 34 and the insert 16. The first component is an interior annular lip 82 which protrudes inwardly from the cylindrical collar 42. The annular lip 82 has an inner diameter $d_1$ which is slightly smaller than the outer diameter $d_2$ of the conduit 34. When the conduit 34 is inserted into the cylindrical collar 42 near the conduit receiving end 20 of the insert, the collar 42, preferably made of the same semi-rigid elastomer as the shell, flexes to admit the conduit 34 within the interior of the collar 42. The annular lip 82 tightly fits around the exterior of the conduit 34 to provide a first seal of the junction between the conduit 34 and the insert 16.

The second annular component is at least one screw thread and preferably a series of internal screw threads 84 which are unitary with the shell 18 as shown in FIG. 5. The elastomeric screw threads follow the same taper as the metal, internal screw threads 32 in the insert 16 at the conduit receiving end 20. When the conduit 34 is inserted into the collar 42 and screwed into the conduit receiving end 20 of the insert 16, the internal elastomeric screw threads 84 initially engage the external screw threads 80 of the conduit 34. After the conduit 34 is completely screwed into the insert 16, the elastomeric screw threads 84 engage the innermost exterior screw threads 80 of the conduit 34, thereby providing a second seal of the junction between the insert 16 and the conduit 34.

An internal elastomeric bushing 88 is arranged in the interior of the wire exiting end 22 of the insert 16 to insulate the wiring from the metal insert 16. The material of the bushing is preferably the same material that comprises the shell 18.

Although other methods of installing the shell 18 onto the insert 16 and the bushing 88 into the insert 16 may be suitable, it is preferred that the shell 18 be injection molded directly onto the insert 16 and the bushing 88 be injection molded directly into the insert 16. To ensure a lasting molded engagement between the shell 18 and the insert 16 and the bushing 88 and the insert 16, a recess may be fashioned in the insert 16 for locking the shell 18 on the insert 16 or the bushing 88 in the insert 16. The knurled ridges 90 and recessed surfaces 92 in the insert 16 shown in FIG. 4 serve to ensure a lasting molded engagement and prevent the shell 18 molded onto the insert 16 from slipping around the periphery of the insert 16.

The metal insert 16 preferably has at least one duct and preferably two ducts 94, 96 which angularly extend from the interior of the insert 16 to the exterior of the insert 16 as shown in FIGS. 4 and 5. The ducts 94, 96 allow both the shell 18 and the bushing 88 to be injection molded from the same elastomeric material directly onto the metal insert 16, which is preferred. The nexus 98, 100 between the shell 18 and the bushing 88 passes through the ducts 94, 96 in the insert, respectively, so the bushing 88 and the shell 18 form one unitary piece. Consequently, the bushing 88 and the shell 18 can be molded directly onto the preformed metal insert obviating the need to separately mold and install each elastomeric piece onto the insert 16.

It will be appreciated that this detailed description relates to the preferred embodiment by way of example only. Many variations on the invention will be obvious to those knowledgeable in the field, and such obvious variations are within the scope of the invention as described and claimed, whether or not expressly described.

What is claimed is:

1. A hub for connecting a conduit to an enclosure including a wall with an aperture therein, said hub comprising:
   a metal insert having an internal bore extending from a receiving end through an exiting end and defining a longitudinal central axis, said receiving end having internal threads in said bore for receiving corresponding external threads of a conduit, said exiting end being adapted for insertion into said aperture in said wall of said enclosure to communicate said hub with said enclosure and said exiting end having external threads for engaging corresponding internal threads of means for fastening said hub to said enclosure;
   an elastomeric annular flange extending from a periphery of said insert for contacting said wall of said enclosure, said flange having an innermost, inner annular face contained in a first plane perpendicular to said axis, said flange having an outermost, inner annular face acutely angled with respect to said axis and defining an outer circular edge contained in a second plane parallel with said first plane and located nearer the exiting end of the insert than said first plane, said flange including an outer frustoconical surface cooperating with said outermost, inner annular face to define said outer circular edge and being angled with respect to said axis to a degree greater than said outermost, inner annular face such that the thickness of said flange progressively decreases toward said outer circular edge, said annular flange providing the sole seal between said insert and said wall upon connecting said hub to said enclosure.

2. The hub of claim 1 wherein said flange is molded to said insert.

3. The hub of claim 2 wherein said insert has a recess therein for engagement by said flange and retaining said flange on said insert.

4. The hub of claim 1 wherein said insert has a duct which communicates the exterior of said insert to the interior of said insert.

5. The hub of claim 1 wherein said flange is part of a shell which surrounds the receiving end of said insert.

6. The hub of claim 5 wherein said shell has a cylindrical collar extending beyond said receiving end of said insert, an interior of said collar being in communication with said bore in said insert.

7. The hub of claim 6 wherein said collar has an interior annular lip for engaging said conduit to provide a seal between said insert and said conduit upon insertion of said conduit.

8. The hub of claim 6 wherein said collar has an internal thread for engaging the external threads of said conduit to provide a seal between said insert and said conduit upon screwing said external threads of said conduit into said internal threads of said hub.

9. The hub of claim 4 which includes a bushing made of elastomeric material set within the interior of said exiting end to insulate said insert.

10. The hub of claim 9 wherein said bushing is linked to said shell through said duct in said insert, so the bushing is unitary with said shell.

11. The hub of claim 5 wherein said shell has a plurality of faces adjacent said flange to accommodate gripping by a torquing tool.

12. The hub of claim 11 wherein said shell has six working faces to provide a hexagonal nut integral with said hub.

13. The hub of claim 1 wherein said insert is corrosion resistant.

14. The hub of claim 13 wherein said insert is made of stainless steel.

15. The hub of claim 1 wherein said insert has a knurled surface to prevent the flange from slipping around the periphery of the insert.

16. The hub of claim 1 in combination with a conduit and an electrical enclosure to form a hub assembly.

17. The hub of claim 16 in combination with a nut plate for maintaining said hub in said enclosure.

18. A hub for connecting a conduit to an enclosure including a wall with an aperture therein, said hub comprising:
   a metal insert having an internal bore extending from a receiving end through an exiting end, said receiving end having internal threads in said bore for receiving corresponding external threads of a conduit, said exiting end being adapted for insertion into said aperture in said wall of said enclosure to communicate said hub with said enclosure and said exiting end having external threads for engaging corresponding internal threads of means for fastening said hub to said enclosure;
   an elastomeric annular flange extending from a periphery of said insert for contacting said wall of said enclosure and providing a reliable seal between said insert and said wall upon connecting said hub to said enclosure;
   an elastomeric shell integral with said annular flange and surrounding at least a portion of said receiving end of the hub;
   an elastomeric bushing received within said bore in the exiting end of said hub;

said insert having at least one duct communicating the exterior of said insert with the interior of said insert; and an elastomeric formation received within said duct and being integral with said shell and said bushing.

19. A hub for connecting a conduit to an enclosure including a wall with an aperture therein, said hub comprising:

a metal insert having an internal bore extending from a receiving end through an exiting end, said receiving end having internal threads in said bore for receiving corresponding external threads of a conduit, said exiting end being adapted for insertion into said aperture in said wall of said enclosure to communicate said hub with said enclosure and said exiting end having external threads for engaging corresponding internal threads of means for fastening said hub to said enclosure;

an elastomeric annular flange extending from a periphery of said insert for contacting said wall of said enclosure and providing a reliable seal between said insert and said wall upon connecting said hub to said enclosure;

said flange being part of a shell which surrounds the receiving end of said insert;

said shell having a cylindrical collar extending beyond said receiving end of said insert, an interior of said collar being in communication with said bore in said insert; and said collar having an interior annular lip for engaging said conduit to provide a seal between said insert and said conduit upon insertion of said conduit.

20. A hub for connecting a conduit to an enclosure including a wall with an aperture therein, said hub comprising:

a metal insert having an internal bore extending from a receiving end through an exiting end, said receiving end having internal threads in said bore for receiving corresponding external threads of a conduit, said exiting end being adapted for insertion into said aperture in said wall of said enclosure to communicate said hub with said enclosure and said exiting end having external threads for engaging corresponding internal threads of means for fastening said hub to said enclosure;

an elastomeric annular flange extending from a periphery of said insert for contacting said wall of said enclosure and providing a reliable seal between said insert and said wall upon connecting said hub to said enclosure;

said flange being part of a shell which surrounds the receiving end of said insert;

said shell having a cylindrical collar extending beyond said receiving end of said insert, an interior of said collar being in communication with said bore in said insert;

said collar having an internal thread for engaging the external threads of said conduit to provide a seal between said insert and said conduit upon screwing said external threads of said conduit into said internal threads of said hub.

21. A hub for connecting a conduit to an enclosure including a wall with an aperture therein, said hub comprising:

a metal insert having an internal bore extending from a receiving end through an exiting end, said receiving end having internal threads in said bore for receiving corresponding external threads of a conduit, said exiting end being adapted for insertion into said aperture in said wall of said enclosure to communicate said hub with said enclosure and said exiting end having external threads for engaging corresponding internal threads of means for fastening said hub to said enclosure;

an elastomeric annular flange extending from a periphery of said insert for contacting said wall of said enclosure and providing a reliable seal between said insert and said wall upon connecting said hub to said enclosure;

said flange being part of a shell which surrounds the receiving end of said insert; and said shell having a plurality of faces adjacent said flange to accommodate gripping by a torquing tool.

22. A hub for connecting a conduit to an enclosure including a wall with an aperture therein, said hub comprising:

a metal insert having an internal bore extending from a receiving end through an exiting end, said receiving end having internal threads in said bore for receiving corresponding external threads of a conduit, said exiting end being adapted for insertion into said aperture in said wall of said enclosure to communicate said hub with said enclosure and said exiting end having external threads for engaging corresponding internal threads of means for fastening said hub to said enclosure;

an elastomeric annular flange extending from a periphery of said insert for contacting said wall of said enclosure and providing a reliable seal between said insert and said wall upon connecting said hub to said enclosure;

said flange being part of a shell which surrounds the receiving end of said insert; and said shell having six working faces adjacent said flange to provide a hexagonal nut integral with said hub to accommodate gripping by a torquing tool.

* * * * *